Oct. 26, 1965 H. R. MALMGREN 3,214,006
DIVERTER SECTIONS FOR MOW CONVEYORS
Filed April 26, 1961
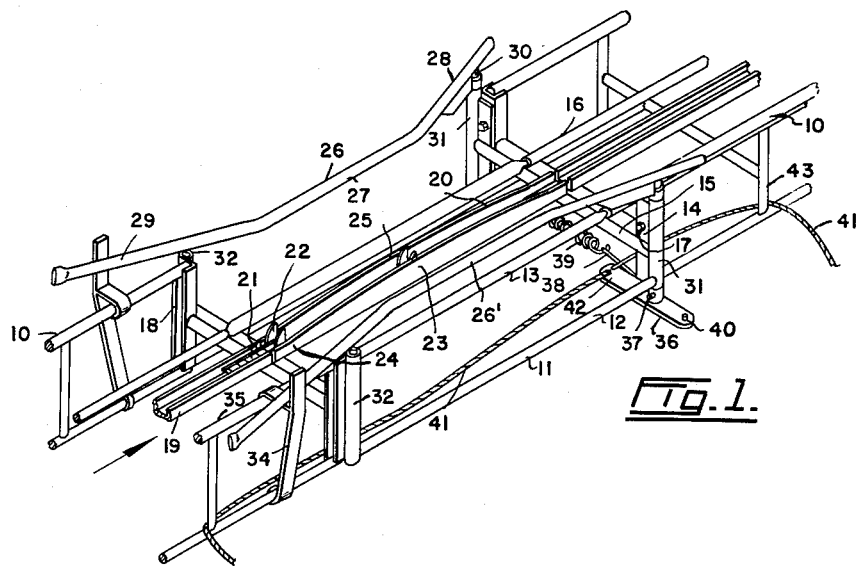
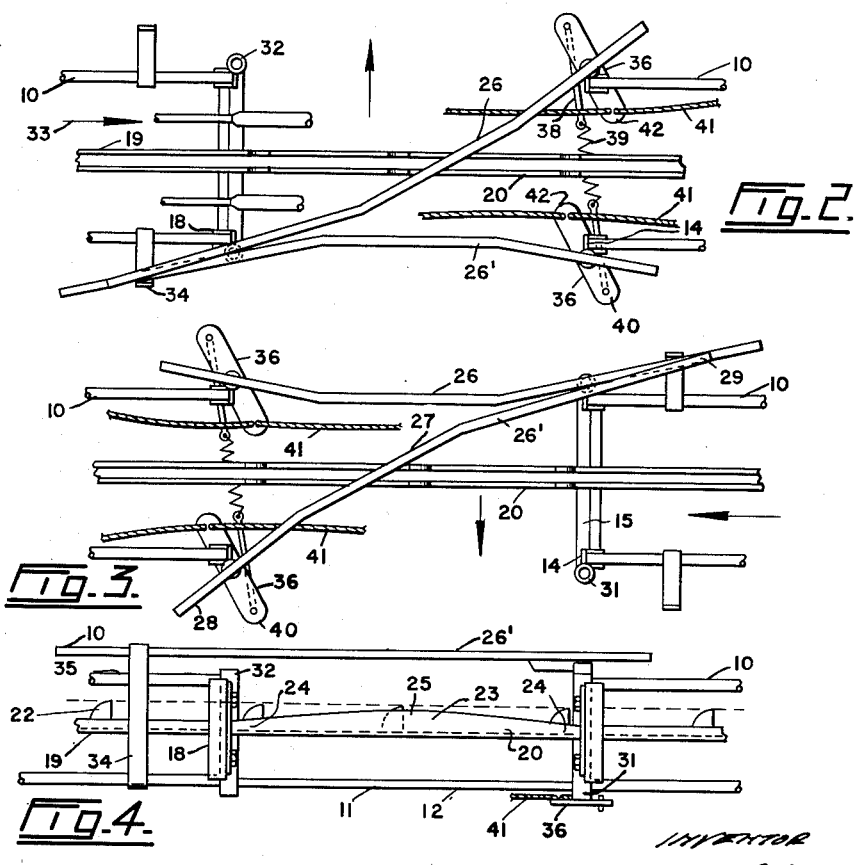
INVENTOR
HARVEY R. MALMGREN

United States Patent Office 3,214,006
Patented Oct. 26, 1965

3,214,006
DIVERTER SECTIONS FOR MOW CONVEYORS
Harvey R. Malmgren, Winnipeg, Manitoba, Canada, assignor, by mesne asignments, to Alco Equipment Ltd., Winnipeg, Manitoba, Canada
Filed Apr. 26, 1961, Ser. No. 105,609
7 Claims. (Cl. 198—188)

My invention relates to new and useful improvements for diverter sections for mow conveyors.

Conventional mow conveyors are adapted to elevate hay bales or the like in a storage building, and to transport them therealong to facilitate the loading and storage of said bales within said building.

Such conventional mow conveyors normally incorporate one or more diverters built therein which are adapted to run the bales up a ramp and over the side rail. This not only requires considerable effort to be exerted by the conveyor chain but in most cases the bale requires the push of the following bale in order to dump same consequently the last bale may remain on the conveyor.

I have overcome these disadvantages by providing a 4 ft. diverter section which can readily be inserted anywhere along the length of an existing conveyor in place of a standard 4 ft. mow conveyor section and which furthermore is adapted to divert to the left or to the right or to permit the bale to pass therethrough and which is adapted to operate with the conveyor travelling in either direction.

The principal object and essence of my invention is therefore to provide a diverter section for a mow conveyor readily insertable anywhere along the length thereof and adapted to divert bales to the left or to the right as desired without having to elevate said bales over the side of the diverter section.

Yet another object of my invention is to provide a device of the character herewithin described which is adapted to be used with a conveyor operating in either direction.

A still further object of my invention is to provide a device of the character herewithin described which includes means to partially disengage the conveyor chain from the underside of the bale at the diverter section thereby eliminating the side drag of the bale as it is diverted which has the tendency to strain and sometimes break the conveyor chain.

A yet further object of my invention is to provide a device of the character herewithin described which is readily operated remotely from the diverter section so that the diverter section can divert bales either to the left or to the right or, alternatively, permit the bales to pass therethrough to the next diverter section.

Still another object of my invention is to provide a device of the character herewithin described which is suitable for diverting all sizes of bales whether they be round, regular or half bales.

A still another object of my invention is to provide a device of the character herewithin described in which the bale does not have to be lifted up over the conveyor side rail in order to be dumped.

A yet further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of my diverter section.

FIGURE 2 is a substantially schematic plan view of my section, showing same in position to divert bales in one direction.

FIGURE 3 is a view similar to FIGURE 2 but showing the device set to divert a bale to the opposite side and from the opposite direction to FIGURE 2.

FIGURE 4 is a side elevation of my diverter section showing the ramp channel for disengaging the chain from the underside of the bales.

In the drawings like characters of reference indicate corresponding parts in the different figures.

Proceeding therefore to describe my invention in detail, reference should be made to the accompanying drawings in which I have shown in FIGURE 1, a mow conveyor conventionally designated 10 and my diverter section collectively designated 11 inserted sequentially therebetween.

In detail, the diverter section 11 consists of a substantially open framework including longitudinal framemembers 12 and 13 which, together with verticals 14 form side components. These side components are maintained in spaced and parallel relationship one with the other by means of transverse cross members 15 extending therebetween and at either end thereof.

The uppermost members 13 correspond with longitudinal members 16 of the mow conveyor and the spacing therebetween is such that they correspond to the longitudinals 16.

The vertical members 14 attach the diverter section 11 to the ends of the mow conveyor by means of bolts 17 passing through these members and corresponding members 18 at the ends of the mow conveyor, so that when in position, the entire conveyor is rigid and the diverter section forms part thereof.

In the mow conveyor 10, a chain guiding channel 19 is provided centrally between the longitudinals 16 and a corresponding channel 20 extends longitudinally through my diverter section 11 and centrally therebetween, being secured to the transverse member 15 as clearly shown in the drawings. This channel permits the conveyor chain 21 to pass through the diverter section as part of the mow conveyor.

Tines 22 are secured to and extend upwardly from the chain 21 at intervals along the length thereof and are adapted to engage the underside of the bale (not illustrated) in order to transport the bale through the conveyor.

However, it is desirable, when diverting the bale at the section 11 to partially disengage these tines from the underside of the bale in order to facilitate the diverting and dumping of the bale and reduce side strain occurring to the chain at this point and also to prevent side movement of the chain.

I accomplish this by the means shown in FIGURE 4 in which the side flange members 23 of the channel section 20 through the diverter gradually increase in height from both ends 24 thereof towards the center 25 at which point the upper ends of the tines 22 only partially extend above the contour of the side flanges.

As the bale is riding on these flanges, it will be appreciated that it is elevated slightly as it reaches the diverter section thus withdrawing from the tines 22 and permitting the diversion and dumping of the bale at this point. The side flange members also support the chain against sideways movement in this area.

Alternatively, if it is desired to allow the bales to pass clear through the diverter section, a sufficient portion of the tines still engages the underside of the bale to prevent slippage occurring at this point. In the event that the bale material is lightly packed and slippage does occur at this point, shims (not illustrated) may be placed under the chain and within the channel at this point in order to elevate the tines slightly.

I have provided a pair of diverter arms 26 and 26' consisting of central parallel portions 27 and out-turned end portions 28 and 29.

Secured to and depending downwardly from the ends 28 of the diverter arms 26 and 26' is a cylindrical spindle 30 adapted to be engaged within vertically situated bearing sleeves 31 and 32 secured to all four corners of the diverter section as clearly shown.

In FIGURE 1 the diverter arms are journalled for pivotal movement in a horizontal plane within the cylindrical sleeves 31 but it will be appreciated that, if the conveyor is operating in the opposite direction to arrow 33 then the arms may be removed from these sleeves and in turn inserted within the sleeves 32 of the opposite corners.

In the position shown in FIGURE 1, the arms are restrained from further outward movement by means of restrainers 34 secured to the side frames 35 of the mow conveyor 10 but once again, if the position of the diverter arms is reversed, then the restrainers 34 will have to be changed to the opposite mow conveyor section adjacent the sleeves 31.

The lowermost ends of spindles 30 (not illustrated) extend beyond the lowermost ends of the sleeves 31 and have actuating levers 36 clamped thereon by means of bolts 37. These levers normally lie substantially transversely of the conveyor as shown in FIGURE 1 but slightly offset and the two levers are connected together by means of rod links 38 extending between a transversely situated spring 39 and the outermost ends 40 of these actuating levers.

This permits an overcenter action so that the spring maintains the diverter arms in the desired position once the actuating arms have been operated.

Ropes or cords 41 extend from the innermost ends 42 of the arms around various vertical struts 43 to a convenient point remote from the diverter section whereby the diverter arms can be actuated as desired.

In operation, the diverter arms can be maintained in the position shown in FIGURE 1 whereby the bales pass clear through the diverter section.

Alternatively, the requisite lever 36 may be operated by the ropes 41 to swing the diverter arm 26 diagonally across the section as shown in FIGURE 2. This means that bales will be diverted by this arm and dumped out of the side of the diverter section until such time as this arm is returned to its parallel position.

It will be observed that the arm 26 is in the position shown in FIGURE 2, the lever 36 is overcenter so that the spring 39 maintains the arm in the diverting position shown. At the same time the tension of the spring maintains the opposite arm 26' in the parallel position as shown.

It will also be appreciated that the ramp 20 will have disengaged the tynes 22 from the underside of the bale to a certain extent thus facilitating the disengagement of the bale from the chain as it is tipped through the side of the diverter section.

FIGURE 3 shows the arm 26 in the reversed position to be utilized with the conveyor running in the opposite direction from that shown in FIGURE 2.

It will also be appreciated that, if desired arm 26 can be returned to its parallel position and arm 26' pivoted diagonally across the diverter section thus causing the bales to be diverted to the opposite side of the mow conveyor all of which may be operated remotely by the aforementioned cords or ropes 41.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a bale conveyor, a conveyor section having at least one open side, a bale propelling chain passing longitudinally through said section and including upstanding bale engaging elements, a diverter arm swingably mounted at the open side of said section and swingable toward the relatively opposite side for diverting a passing bale laterally through the open side of the section, and a bale engaging ramp extending in said section alongside of said chain, said ramp being inclined in the direction of travel of the chain and the highest point of the ramp being disposed adjacent to but below upper extremities of said upstanding elements of the chain, whereby to partially disengage a bale from said elements during its passage through said section and permit the bale to be laterally diverted by said arm.

2. The device as defined in claim 1 together with resiliently biased means connected to said diverter arm for selectively retaining the same in and out of its bale diverting position.

3. The device as defined in claim 1 together with remotely controlled means connected to said diverter arm for swinging the same into and out of its bale diverting position, and resiliently biased means connected to the arm for releasably retaining the same selectively in its two positions.

4. The device as defined in claim 1 wherein said bale propelling chain is movable through said conveyor section selectively in opposite directions, together with pivot means mounting said arm selectively at opposite ends of the open side of said section.

5. A diverter section for chain operated mow conveyors adapted to be inserted along the run of said mow conveyor, comprising in combination a framework having dimensions to suit insertion within said mow conveyor, said framework including a pair of spaced and parallel side components, transverse cross braces maintaining said side components in said spaced and parallel relationship, means to secure said diverter section in sequence with said mow conveyor, means to carry said operating chain through said diverter section, a pair of diverter arms pivotlly mounted for horizontal movement one each upon the corners of one end of said diverter section and selectively swingable diagonally thereacross to intercept and divert a bale entering said section, means to swing said diverter arms diagonally thereacross or parallel with said diverter section, and ramp means extending through said diverter section, said operating chain passing through said ramp means, said ramp means being adapted to partially disengage said chain from the underside of said bale when said bale is within said diverter section, said ramp means comprising a channel within which said operating chain rides, the side plates of said channel increasing gradually in height from each end towards the center thereof.

6. The device according to claim 5 in which said diverter arms are selectively mountable on the corners of one end or the other of said diverter section.

7. In a bale conveyor, a conveyor section comprising a framework including a pair of spaced parallel side components and cross braces securing said side components together, a bale propelling chain passing through said conveyor section, a pair of diverter arms pivotally mounted for horizontal movement one each upon the corners of one end of said section and selectively swingable diagonally thereacross or parallel with said section to resepctively divert a bale laterally from the section or permit it to pass longitudinally therethrough, and ramp means comprising a channel mounted in said section and having said chain riding therein, the sides of said channel increasing in height from each end toward the center thereof, whereby to partially disengage the chain from a bale passing through said section over said ramp means.

References Cited by the Examiner
UNITED STATES PATENTS

| | | | |
|---|---|---|---|
| 958,090 | 5/10 | Burk | 198—178 X |
| 1,016,740 | 2/12 | Ellison | 198—178 X |
| 1,426,347 | 8/22 | Bieber | 198—178 |
| 2,792,102 | 5/57 | Schuchert | 198—188 X |
| 2,990,053 | 6/61 | Lance et al. | 198—185 |
| 3,001,635 | 9/61 | Beiler | 198—188 X |

SAMUEL F. COLEMAN, *Primary Examiner.*

JULIUS E. WEST, ERNEST A. FALLER, *Examiners.*